(12) United States Patent
Karweck et al.

(10) Patent No.: US 12,729,997 B2
(45) Date of Patent: Sep. 8, 2026

(54) CALIBRATION OF MODULAR FILL-LEVEL GAUGES

(71) Applicant: Endress+Hauser SE+Co. KG, Maulburg (DE)

(72) Inventors: Lars Karweck, Binzen (DE); Ralf Armbruster, Schallstadt (DE); Marc Andreas Schlachter, Wehr (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 533 days.

(21) Appl. No.: 18/245,204

(22) PCT Filed: Aug. 16, 2021

(86) PCT No.: PCT/EP2021/072676
§ 371 (c)(1),
(2) Date: Mar. 14, 2023

(87) PCT Pub. No.: WO2022/058101
PCT Pub. Date: Mar. 24, 2022

(65) Prior Publication Data

US 2023/0273064 A1 Aug. 31, 2023

(30) Foreign Application Priority Data

Sep. 17, 2020 (DE) ..................... 10 2020 124 299.9

(51) Int. Cl.
*G01F 25/20* (2022.01)
*G01F 23/284* (2006.01)
*G01F 23/2962* (2022.01)

(52) U.S. Cl.
CPC ............ *G01F 25/20* (2022.01); *G01F 23/284* (2013.01); *G01F 23/2962* (2013.01)

(58) Field of Classification Search
CPC ..... G01F 25/20; G01F 23/284; G01F 23/2926
See application file for complete search history.

(56) References Cited

U.S. PATENT DOCUMENTS 5,226,320 A * 7/1993 Dages ................. G01F 23/2962
367/908
9,581,485 B2 2/2017 Haynes et al.
(Continued)

FOREIGN PATENT DOCUMENTS

CN 104614042 A 5/2015
CN 206583473 U 10/2017
(Continued)

*Primary Examiner* — Kristina M Deherrera
*Assistant Examiner* — Jean F Morello
(74) *Attorney, Agent, or Firm* — Brannon Sowers & Cracraft PC

(57) ABSTRACT

A method for calibrating a modular fill-level gauge based on a capacitive, an ultrasonic, or a radar based measuring principle and including components as follows: a sensor module, an electronics module and a transmission module comprises connecting the transmission module with the sensor module, calibrating the sensor module, and instructing the electronics module relative to the installed height. This simplifies the calibrating of the fill-level gauge, since it does not have to be applied to the entire fill-level gauge but only to the sensor module. In this way, a corresponding calibration setup only needs to be kept at the site of the sensor module manufacture, and not supplementally at the site of the final manufacture, where all modules of the fill-level gauge are put together. Correspondingly, also the possible creating of a calibration protocol is simplified.

7 Claims, 3 Drawing Sheets

(56) References Cited

U.S. PATENT DOCUMENTS

| | | | | |
|---|---|---|---|---|
| 9,599,501 | B2 | 3/2017 | Kokawa | |
| 2004/0183550 | A1* | 9/2004 | Fehrenbach | G01F 23/14 324/662 |
| 2005/0253751 | A1 | 11/2005 | Feisst et al. | |
| 2007/0199365 | A1 | 8/2007 | Skowaisa et al. | |
| 2010/0000316 | A1 | 1/2010 | Fehrenbach et al. | |
| 2011/0314907 | A1* | 12/2011 | Wiedekind-Klein | G01F 23/268 73/304 C |
| 2013/0167613 | A1 | 7/2013 | Kokawa | |
| 2014/0326038 | A1 | 11/2014 | Fauveau | |
| 2016/0041025 | A1 | 2/2016 | Haynes et al. | |

FOREIGN PATENT DOCUMENTS

| | | | |
|---|---|---|---|
| CN | 110579753 | A | 12/2019 |
| CN | 110579753 | A1 | 12/2019 |
| DE | 102004035097 | A1 | 2/2006 |
| DE | 102017106045 | A1 | 9/2018 |
| EP | 1128169 | A1 | 8/2001 |
| JP | 2020128897 | A | 8/2020 |
| WO | 2004017025 | A1 | 2/2004 |

* cited by examiner

CALIBRATION OF MODULAR FILL-LEVEL GAUGES

CROSS-REFERENCE TO RELATED APPLICATIONS

The present application is related to and claims the priority benefit of DPMA Patent Application No. 10 2020 124 299.9, filed on Sep. 17, 2020, and International Patent Application No. PCT/EP2021/072676, filed Aug. 16, 2021, the entire contents of which are incorporated herein by reference.

TECHNICAL FIELD

The invention relates to a method for producing and calibrating modular fill-level gauges.

BACKGROUND

In automation technology, especially for process automation, field devices are often applied, which serve for registering diverse measured variables. The measured variable to be determined can be, for example, a fill-level, a flow, a pressure, the temperature, the pH value, the redox potential, a conductivity or the dielectric value of a medium in a process plant. For registering the corresponding measured values, the field devices comprise suitable sensors and are based on suitable measuring principles. A large number of different field device types are manufactured and sold by the Endress+Hauser group of companies.

For fill-level measurement of fill substances in containers, capacitive- as well as radar- and ultrasonically based measuring principles have proven themselves, since these are robust and low-maintenance. A central advantage of these measuring principles lies in their ability to measure fill-level virtually continuously. In such case, the terminology, "ultrasound" in the context of this invention refers to sound waves in a frequency range between 14 kHz and 1 GHz. The term "radar" concerns radar signals with frequencies between 0.03 GHz and 300 GHz, wherein usual radar frequency bands, at which fill-level measurement is performed, lie, for example, at 2 GHz, 26 GHz, 79 GHz, and 120 GHz. In the case of application of ultrasound, the usual measuring principle is based on measuring the pulse travel time. In the case of radar, besides the pulse travel time principle (also known as "pulse radar"), also the FMCW ("Frequency Modulated Continuous Wave") principle is used for determining distance, and fill-level. A fill-level gauge working according to the pulse travel time method is described, for example, in Offenlegungsschrift DE 10 2012 104 858 A1. A typical construction of FMCW based fill-level gauges is described, by way of example, in Offenlegungsschrift DE 10 2013 108 490 A1. The measuring principles of FMCW and pulse radar are described in detail in "Radar Level Detection, Peter Devine, 2000".

Besides the freely radiating radar signal sent and received between antenna and fill substance in the pulse travel time principle and the FMCW principle, there is, moreover, also the guided radar principle (better known as "TDR, Time Domain Reflectometry"). In such case, the radar signal is not radiated from an antenna, but, instead, coupled into an electrically conductive measuring probe, which extends, for instance, perpendicularly into the fill substance and to just above the container floor. In the case of TDR, the radar signal is reflected in the measuring probe at the height of the fill substance surface, so that the reflected, received signal can be used to determine the fill-level.

Analogously to guided radar, also in the case of capacitive measuring principles, a measuring probe is used for fill-level measurement. In the case of the capacitive measuring principle, the effect is utilized that the capacitance of the measuring probe depends on the fill-level. In order to determine the capacitance, an alternating voltage signal is coupled into the measuring probe and the fill-level is determined based on the correspondingly ascertained, received variable, such as, for example, an impedance or a resonant frequency.

Capacitive-, radar- and ultrasonically based fill-level gauges have in common that they are often built modularly, comprising a sensor module, a transmission module and an electronics module. In this way, it is possible to build diverse fill-level gauges-, and field device types, based on a common electronics module. In such case, the electronics module of field devices serves essentially to convert the sensor signals obtained by the specific sensor module into a standardized measured value signal used in the particular process plant. Often used as standard is, for example, the 4-20 mA range according to DIN-IEC 60381-1. In the sensor module, in turn, the selected measuring principle is implemented for ascertaining the distance to the fill substance, such that the sensor module can output the distance value in the form of a corresponding sensor signal. In such case, the sensor module frequently produces the sensor signal as a digital signal. Accordingly, the electronics module is designed to receive and to process the digital sensor signal.

The design of the transmission module is guided by the measuring principle implemented in the sensor module: In the case of freely radiating radar (FMCW and pulse travel time measuring), the transmission module is composed essentially of an antenna, which is matched to the frequency and into which the radar signal is coupled, for example, via a hollow conductor. In the case of the capacitive measuring principle and in the case of guided radar, the transmission module is implemented in the form of an electrically conductive probe, which extends mounted in the container. In the case of implementing ultrasound, the transmission module functions virtually as a loudspeaker/microphone and includes, for example, a piezo element for out- and in-coupling of the signal.

Especially in the case of applications requiring certification, it is necessary to create a so-called calibration protocol for the manufactured fill-level gauge. Involved in such case is proof by the manufacturer that the measuring device correctly measures within the framework of the required error tolerance. Accordingly, the calibration protocol is created in a corresponding test series by reconciling or setting in correspondence with one another the fill-level measured values ascertained using the fill-level gauge for set fill-levels (or set distances to a reflector in a calibration setup).

SUMMARY

Since the individual modules are manufactured separately from one another, while the calibration, or the calibration protocol, does need to be done for the total fill-level gauge, a logistically correspondingly complex calibration process is present. An object of the invention, therefore, is to provide a logistically simplified manufacturing- and calibration process for continuously measuring, fill-level gauges.

The invention achieves the object by a method for manufacturing and calibrating a modular fill-level gauge based on a capacitive, an ultrasonic, or radar based, measuring principle and including modules as follows:

a transmission module, into which an alternating voltage signal is coupleable in such a manner that the alternating voltage signal is transmitted in the direction of the fill substance, or other reflector, and, after reflection, is received as corresponding, received variable, a sensor module, which includes a signal production unit, which is designed to produce the alternating voltage signal according to the appropriate measuring principle, and an evaluation unit, which is designed to convert the received variable by means of a calibration function into a sensor signal, which represents a distance between the fill-level gauge and the reflector, and an electronics module, which is designed to use a known, installed height to convert the sensor signal into a standardized measured value signal (for example, according to the 4-20 mA standard) representing the fill-level and which includes a first interface to the evaluation unit, in order to receive the sensor signal, and a second interface, which is designed to output the measured value signal to a superordinated unit.

The term "reflectors" within the scope of the invention concerns a calibration setup and can be defined differently, depending on implemented measuring principle: In the case of freely radiating radar and ultrasound, it is a reflecting surface, such as, for example, a plate arranged in a calibration setup. In the case of guided radar and the capacitive measuring principle, the term "reflector" is, for example, a securement, which terminates the measuring probe after an appropriate distance.

The method of the invention comprises method steps as follows:

connecting the transmission module with the sensor module, and then calibrating the sensor module using a suitable calibration setup by transmitting the alternating voltage signal in the presence of at least one defined distance between the fill-level gauge and the reflector, in each case, registering the corresponding, received variable, and based on the at least one registered, received variable and, in each case, the corresponding distance, creating the calibration function, and instructing the electronics module by inputting the installed height of the fill-level gauge, for example, via a touch screen module.

According to the invention, such method simplifies the manufacturing process of the fill-level gauge, since the electronics module does not have to be connected at the time of the calibrating of the sensor module, but, instead, only at the final assembly or, at the latest, at the site of use.

The calibrating of the sensor module is potentially more exact, the more distances and corresponding, received variables are taken into consideration for creating the calibration function. Therefore, advantageously, the alternating voltage signal is transmitted in the presence of two or more defined distances between the fill-level gauge and the reflector, and the calibration function is created based on these distances and the corresponding, received variables.

Based on such method, according to the invention, a calibration protocol can be created by transmitting the signal to be transmitted in the presence of at least one defined, set distance to the reflector and, after reflection, receiving the corresponding, received variable, producing the sensor signal based on the received variable and the calibration function stored in the sensor module, converting the sensor signal into the standardized measured value signal using the expected installed height, and reconciling the at least one fill-level represented by the measured value signal with the set distance, or the corresponding fill-level value.

In such case, the sensor signal produced by the sensor module is stored especially in an external memory unit, such that the sensor signals are transmitted to the electronics module from the external memory unit, for example, via the first interface. Advantageous in this creating of the calibration protocol according to the invention is that the electronics module and the sensor module do not have to be connected together at the point in time of the creating of the calibration protocol.

The calibrating of the sensor module can be improved by supplementally performing a temperature compensation. In such case, the temperature compensation can be performed by producing the alternating voltage signal at at least one defined distance and at least two different temperatures—for this, the sensor module can, for example, be operated in a temperature-controlled chamber, after reflection, registering the corresponding, received variables, and creating a compensation function based at least on the received variables and the corresponding temperatures.

In subsequent measurement operation, the temperature compensation can be applied when the sensor module includes a temperature sensor, by means of which the ambient temperature can be measured. In such case, the sensor unit can output the sensor signals temperature compensated by means of the compensation function and the measured ambient temperature.

The terms "module" and "unit" mean in the context of the invention, in principle, any electrical circuit and any sensor suitably designed for the contemplated application. It can thus, depending on requirement, be an analog circuit for producing, or processing, corresponding analog signals. It can also be a digital circuit, such as an FPGA or a storage medium interacting with a program. In such case, the program is designed to perform the corresponding method steps, or to apply the necessary computer operations of the particular unit. In this context, different electronic units of the fill-level gauge can, within the scope of the invention, potentially also use a shared physical memory, or be operated by means of the same physical, digital circuit.

BRIEF DESCRIPTION OF THE DRAWINGS

The invention will now be explained in greater detail based on the appended drawing, the figures of which show as follows.

DETAILED DESCRIPTION

Figure 1:
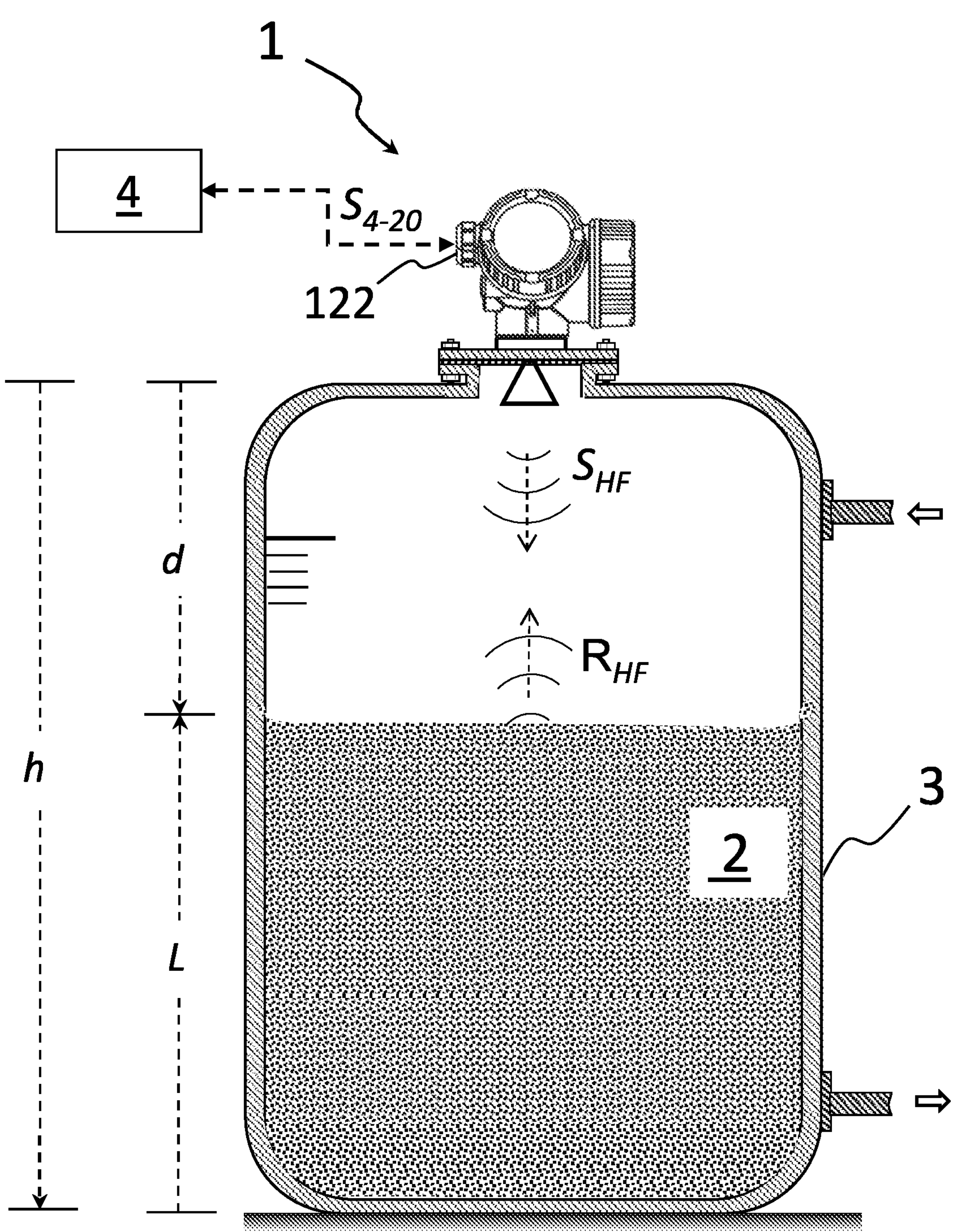
FIG. 1 shows a schematic arrangement of a travel time based, fill-level gauge mounted on a container.

For providing a basic understanding of the invention, shows FIG. 1 a freely radiating, fill-level gauge 1, which works according to a radar- or ultrasonic measuring principle and is arranged on a container 3. In such case, there is located in the container 3 a fill substance 2, whose fill-level L is to be determined by the fill-level gauge 1. In order to determine the fill-level L, the fill-level gauge 1 is placed at a known, installed height h on the top of the container 3.

Since radar- and ultrasound involve travel time based measuring principles, the fill-level gauge 1 is so designed that it transmits, or sends, a radar-, or ultrasonically based signal $S_{HF}$ approximately perpendicularly in the direction of the fill substance 2. In the case of the example of an embodiment displayed in FIG. 1, the fill-level gauge 1 includes a horn shaped antenna for this. In contrast with the shown embodiment, it is in the case of guided radar ("TDR") and in the case of capacitive measuring principles usual that the fill-level gauge 1 has instead of the antenna a rod- or cable shaped measuring probe, which extends starting from the fill-level gauge 1 perpendicularly to just above the container floor. In such case, the corresponding alternating voltage signal $S_{HF}$ is coupled into the measuring probe.

At the surface of the fill substance 2, the signal $S_{HF}$ is reflected and after a corresponding signal travel time correspondingly received by the fill-level gauge 1 as received signal $R_{HF}$. In such case, the signal travel time of the signal $S_{HF}$, $R_{HF}$ depends on the distanced between the fill-level gauge 1 and the fill substance surface. Based on the received signal $R_{HF}$, the signal travel time of the signal $S_{HF}$, $R_{HF}$ is determined. Based on the signal travel time, the fill-level gauge 1 determines, in turn, the distanced to the fill substance 2. The installed height h of the fill-level gauge 1 stored in the fill-level gauge 1 enables determining the fill-level L based on the measured distance d using the relationship d=h−L. In the case of the capacitive measuring principle (not shown), the fill-level gauge 1 determines, instead of the radar- or ultrasonically based received signal $R_{HF}$ as received variable, an impedance or an eigenfrequency, from which the fill-level-dependent capacitance of the measuring probe and, thus, in turn, the distance d, i.e. the length of the measuring probe not wetted by the fill substance, can be determined.

As generally usual in the case of field devices, the fill-level gauge 1 is connected via an interface 122, such as, for instance, "4-20 mA", "Ethernet", "PROFIBUS", "HART" or "wireless HART", to a superordinated unit 4, for example, a process control system or a decentral database. In this way, primarily the fill-level value L can be transmitted, in order, in given cases, to control in- or out flows to and from the container 3. Moreover, however, also information concerning the operating state of the fill-level gauge 1 can be communicated.

Figure 2:
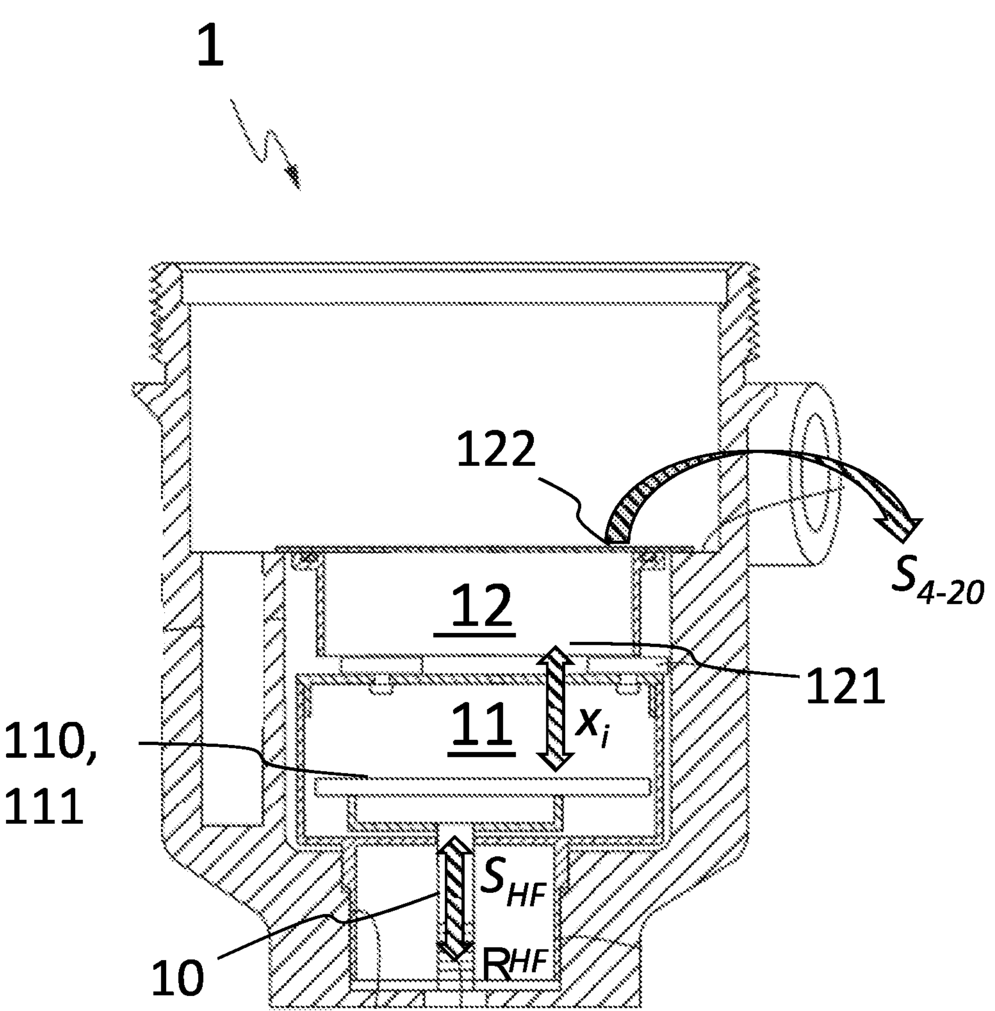
FIG. 2 shows a detail view of the individual modules of the fill-level gauge.

The individual functions of the fill-level gauge 1 are carried out by the corresponding modules. The modules are shown schematically in FIG. 2 by way of example arranged within the device housing. For communication with the superordinated unit 4, the interface 122 of the fill-level gauge 1 is a component of an electronics module 12 usable in the case of the most varied of field device types. Besides the transmission of peripheral data, this module 12 especially enables forwarding of the fill-level value L in the form of a standardized measured value signal $S_{4\text{-}20}$ to the superordinated unit 4 using one of the above mentioned protocols ("4-20 mA", "Ethernet", "PROFIBUS", "HART" or "wireless HART"). Since for ascertaining fill-level L besides the distance value d also the installed height h of the fill-level gauge 1 does need to be known, the electronics module 12 includes a predefined memory for storing the installed height h. For inputting the installed height h, the electronics module 12 can be connected with, for example, an input module (not shown), such as, for example, a touch screen.

The electronics module 12 obtains the distance value d from a sensor module 11 as, in given cases, an already digitized sensor signal x via a second interface 121. In such case, the sensor module 11 is arranged in the device housing below the electronics module 12. For generating the sensor signal x, an evaluation unit 111 of the sensor module 11 converts the received signal $R_{HF}$ appropriately according to the pulse travel time principle or according to the FMCW principle. In order that the evaluation unit 111 can correctly associate the travel time information contained in the received signal $R_{HF}$ with the distance d to the fill substance surface, it refers when converting the received signal $R_{HF}$ into the sensor signal x to a calibration function $d_i(R_{HF,i})$ stored individually for the fill-level gauge 1. Also in the case of TDR or capacitive fill-level measurement, a corresponding calibration function $d_i(R_{HF,i})$ is required, in order that the evaluation unit 111 can correctly associate the corresponding, received variable $R_{HF}$ with the length of the measuring probe not wetted by the fill substance 2, such corresponding to the distance d to the fill substance 2. In this way, independently of the implemented measuring principle, it is assured that the sensor signal x correctly contains the distanced from the fill-level gauge 1 to the surface of the fill substance 2.

The horn antenna of the fill-level gauge 1 shown in FIG. 1, by means of which the radar-, or ultrasonic signal $S_{HF}$ is transmitted to fill substance 2 and after reflection received as received signal $R_{HF}$, is a component of the transmission module 10. As displayed in FIG. 2, the transmission module 10 is located in the mounted state below the sensor module 11 and is operated by the sensor module 11 by means of a corresponding alternating voltage signal $S_{HF}$. In such case, the frequency of the alternating voltage signal $S_{HF}$ depends on the chosen measuring principle. In the case of freely radiating radar and TDR, the frequency of the alternating voltage signal $S_{HF}$ lies in the range between 0.03 GHz and 300 GHz, while the frequency in the case of ultrasound lies between 14 kHz and 1 GHz. Depending on capacitive measuring principle, the alternating voltage signal $S_{HF}$ has a frequency between 0.5 kHz and 5 kHz. For producing the alternating voltage signal $S_{HF}$, the sensor module 11 includes a signal production unit 110, which produces the alternating voltage signal $S_{HF}$ according to the chosen measuring principle and couples such into the transmission module 10.

The modular construction, on the one hand, facilitates adapting the fill-level gauge 1, depending on field of application, for example, by providing the transmission module 10 with an antenna or with a measuring probe fitted to the installed height h. On the other hand, individual modules of the fill-level gauge 1, such as especially the electronics module 12, can be used in other field device types. This reduces the number of required manufacturing lines.

The modular construction, and adaptability to handle special needs, makes, however, the calibrating of the fill-level gauge 1 more difficult, since the calibration relates to the total fill-level gauge 1 and the container-geometry, while the calibration 100 of individual modules, such as especially the calibrating of the sensor module 11, cannot be omitted. This concerns, above all, also the possible creating of a calibration protocol $[d_i; d_{ij}]$.

Figure 3:
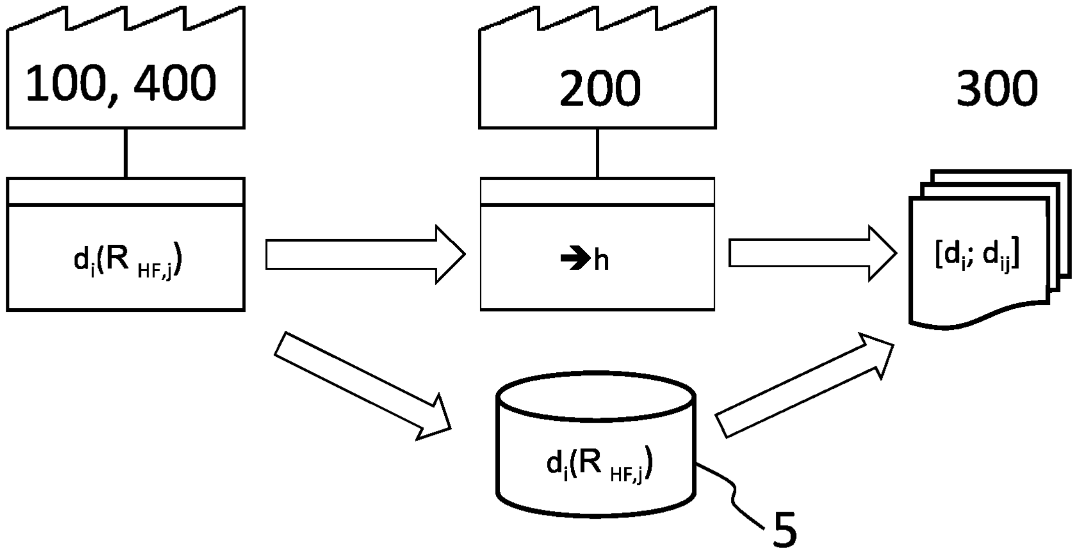
FIG. 3 shows a schematic view of the calibration method of the invention for modularly constructed fill-level gauges.

A process flow chart of the invention, with which the calibration effort connected with the manufacture of modular fill-level gauges 1 can be kept small, is shown schematically in FIG. 3. Starting point for the calibration 100, in such case, is that, firstly, the transmission module 10 and the sensor module 11 are electrically, and mechanically, connected together. Then the calibration 100 of the sensor module 11 plus the particular transmission module 10 occurs using a calibration setup. In such case, the calibration setup includes a reflector, which mimics the fill substance surface with defined distances d, between, for example, 1 m and 25 m from the fill-level gauge 1. Further details for a similar setup for freely radiating radar gauges are contained in EP 03390982 A1, for example.

The calibration 100 of the sensor module 11 is performed in the setup by having the signal production unit 110 of the sensor module 11 produce the alternating voltage signal $S_{HF}$ at a defined number i of different distances $d_i$ between the fill-level gauge 1 and the reflector 2, such that the corresponding radar-, or ultrasonic, signals $S_{HF,i}$ are transmitted to the reflector via the transmission module 10 at the different distances $d_i$. Correspondingly, the evaluation unit 111 of the sensor module 11 receives the received signals $R_{HF,i}$ via the transmission module 10. In such case, the registered received signals $R_{HF,i}$ are stored with the corresponding distances $d_i$. Such can be stored either in the evaluation unit 111, or in an external memory unit 5. Based on this data, the evaluation unit 111 of the sensor module 11 creates and stores the calibration function $d_i(R_{HF,i})$. In such case, the calibration function $d_i(R_{HF,i})$ can be created in the form of an analytical function, for example, using an approximation algorithm, or the calibration function $d_i(R_{HF,i})$ can be stored as a pure look-up table. In both cases, the accuracy of the calibration 100 increases with the number i of employed distances $d_i$. In order that such steps of the calibration 100 can be performed in the sensor module 11, the sensor module 11 does need to be so designed that it can be placed in a corresponding calibration mode.

The accuracy of the calibration 100 can be increased further by adding a temperature compensation 400. The term "temperature compensation" means in this connection that the distance value d represented by the sensor signal x is not corrupted by an ambient temperature deviating from room temperature. In order that the fill-level gauge 1 can implement a compensation, the fill-level gauge 1, e.g. the sensor module 11, does need to be able to measure the ambient temperature, for example, by means of a correspondingly integrated PT 100 temperature sensor. The temperature compensation can be performed in the setup either in the context of an independent test series, or in the context of the above described calibration test series.

In such case, the compensation test series is performed analogously to the calibration method by having the signal production unit 110 produce the alternating voltage signal $S_{HF}$ at at least one of the set distances $d_i$ at at least two different temperatures $T_j$. For this, the sensor module 11 can be accommodated in the setup, for example, in a climate chamber that assures the transmitting of the corresponding ultrasonic, or radar, signal $S_{HF}$, via the transmission module 10 to the reflector. In such case, it is preferred that at least two of the set temperatures $T_j$ lie at the upper- and lower temperature limits of the design specifications, for example, at −15° C. and +45° C. Also the temperature compensation becomes more exact, the more distances d, at the two (or more different) temperatures $T_j$ are used for producing and transmitting the alternating voltage signal $S_{HF}$.

After reflection of the signal $S_{HF}$ on the reflector 2, in turn, the various, corresponding received signals $R_{HF}$ are registered. Thus, the sensor module 11, e.g. the evaluation unit 111, can create a compensation function based on such received signals $R_{HF,i}$ and based on the corresponding temperatures $T_j$. Analogously to the calibration function $d_i(R_{HF,i})$, also the compensation function can be an analytical function or a pure lookup table. Another option in this connection is that the compensation function be created not as an independent function, but, instead, that the calibration function $d_i(R_{HF,i}, T_j)$ is created based on the data from the compensation test series in such a manner that it contains the ambient temperature as another variable. Thus, it is possible for the sensor module 11 in the case of corresponding design to output the sensor signals $x_i$ temperature compensated by means of the compensation function (or by means of the expanded calibration function $d_i(R_{HF,i}, T_j)$) and the measured ambient temperature.

Besides the sensor module 11, according to the invention, no additional modules need to be calibrated. At the same time, the method of the invention has the advantage that the electronics module 12 does not need to be connected in the calibrating of the sensor module 11. Such can occur subsequently in the final assembly of the fill-level gauge 1, thus, in given cases, even at another site. Moreover, the instructing 200 of the electronics module 12 relative to the installed height h does not need to occur in the calibration of the sensor module 11.

Similar considerations hold for the creating 300 of a calibration protocol $[d_i; d_{ij}]$, wherein, for this, a separate protocolling test series of the already calibrated sensor module 11 is performed in the setup. First, at one or more defined, set distances $d_j$, in each case, an alternating voltage signal $S_{HF}$ is produced by the signal production unit 110 and transmitted by means of the transmission module 10 to the reflector 2. After receipt of the corresponding received signals $R_{HF,i}$ via the transmission module 10, the evaluation unit 111 produces the resulting sensor signals $x_{j,j}$ based on the received signal $R_{HF,i}$ and based on the already produced calibration function $d_i(R_{HF,i})$. In such case, the sensor signals $x_{j,j}$ for the calibration protocol $[d_i; d_{ij}]$ are stored in the external memory unit 5. In this connection, the memory unit 5 does not absolutely need to be a fixed component of the setup. The memory unit 5 can also involve a mobile device, such as a smart phone or a tablet PC, wirelessly connectable with the setup, the sensor module 11 and/or the electronics module 12.

In order that the steps of the protocol creation 300 can be performed in the sensor module 11, the sensor module 11 must, in turn, be so designed that it can be placed for this into a corresponding protocolling mode.

Following the protocolling test series of the sensor module 11, for protocol creating 300, the electronics module 12 is supplied from the external memory unit 5 those sensor signals $x_{i,j}$ which were obtained in the protocolling test series of the sensor module 11. In such case, it is advantageous in this connection that the memory unit 5 is connectable with the electronics module 12 via the first interface 121. Moreover, the electronics module 12 is supplied with the installed height h. Using the installed height h, the electronics module 12 can convert the obtained sensor signals $x_{i,j}$ into appropriately standardized measured value signals $S_{4\text{-}20i,j}$. In order to be able to perform the above described method steps in the electronics module 12 for creating the calibration protocol $[d_i; d_{ij}]$, also the electronics module 12 is designed such that, when required, it can be placed in a corresponding protocolling mode.

The measured value signals $S_{4\text{-}20i,j}$ generated by the electronics module 12 in the protocolling mode are converted into the corresponding fill-level values $L_{i,j}$. For this, the electronics module 12 can, for example, be connected via the second interface 122 with an external data processing unit. Also the distances $d_j$ used in the measuring series can be either manually input into the data processing unit, or the data processing unit is connected for this with a corresponding control unit used in the setup. Then, for creating 300 the calibration protocol $[d_i; d_{ij}]$, the data processing unit brings together the measured value signals $S_{4\text{-}20}$ generated by the electronics module 12 in the protocolling mode with the corresponding distances $d_j$, which were used in the setup in the protocolling test series of the sensor module 11. In such case, the bringing together occurs, in that the corresponding distances $d_i$, $d_{ij}$, and fill-levels $L_{ij}$, are reconciled, such that a possible difference between corresponding values is evident. Such is documented as calibration protocol $[d_i; d_{ij}]$, for example, in paper form or appropriately electronically. Advantageous in such method of the invention for creating the calibration protocol $[d_i; d_{ij}]$ is, again, that the sensor module 11 and the electronics module do not need to be connected at the point in time of performing the protocolling test series. This is advantageous for the production of the fill-level gauge 1, in that no costly setup has to be maintained at the site of the final manufacture. Such is instead kept at the site of the sensor module manufacture.

The invention claimed is:

1. A method for manufacturing and calibrating a modular fill-level gauge, comprising:

providing the fill-level gauge that is based on a capacitive, an ultrasonic, or a radar-based measuring principle, the fill-level gauge including:

a transmission module into which an alternating voltage signal is coupled such that the signal is transmitted in a direction of a reflector and after reflection is received as a corresponding received variable;

a sensor module, including:

a signal production unit designed to produce the alternating voltage signal according to the appropriate measuring principle; and an evaluation unit designed to convert the received variable via a calibration function into a sensor signal that represents a distance between the fill-level gauge and the reflector; and an electronics module designed to use a known, installed height to convert the sensor signal into a standardized measured value signal representing the fill-level, the electronics module including:

a first interface to the evaluating unit to receive the sensor signal; and a second interface to output the measured value signal to a superordinated unit;

connecting the transmission module with the sensor module;

calibrating the sensor module, unconnected to the electronics module, by:

transmitting the alternating voltage signal in a presence of at least one defined distance between the fill-level gauge and the reflector;

in each case, registering the corresponding, received variable;

based on the at least one registered, received variable and, in each case, the corresponding distance, creating the calibration function; and storing the calibration function in the sensor module; and instructing the electronics module by inputting the installed height of the fill-level gauge; and connecting the electronics module to the sensor module only after the calibration of the sensor module.

2. The method as claimed in claim 1, wherein the alternating voltage signal is transmitted in the presence of two or more defined distances between the fill-level gauge and the reflector for the calibrating of the sensor module, and wherein the calibration function is created based on these distances and the corresponding received variables.

3. The method as claimed in claim 2, further comprising:

creating a calibration protocol by:

transmitting the signal in the presence of at least one defined, set distance to the reflector and, after reflection, receiving the corresponding, received variable;

producing the sensor signal based on the received variable and the calibration function;

converting the sensor signal into the standardized measured value signal using a known, installed height; and reconciling the at least one fill-level value represented by the measured value signal with the defined, set distance.

4. The method as claimed in claim 3, wherein the sensor signal produced by the sensor module is stored in an external memory unit, and wherein the sensor signals are transmitted to the electronics module from the external memory unit via the first interface.

5. The method as claimed in claim 1, wherein the electronics module is designed to produce the measured value signal according to the 4-20 mA standard.

6. The method as claimed in claim 1, wherein the sensor module is designed to produce the sensor signal as a digital signal, and wherein the electronics module is designed to process the digital sensor signal and to receive the digital sensor signal via the first interface.

7. The method as claimed in claim 1, wherein in the calibration of the sensor module a temperature compensation is performed by:

producing the signal at at least one defined distance and at least two different temperatures;

after reflection, registering the corresponding, received variables; and creating a compensation function based at least on the received variables and the corresponding temperatures, wherein the sensor module is designed to measure the ambient temperature, and wherein the sensor unit is designed to output the sensor signals temperature compensated by means of the compensation function and the measured ambient temperature.

* * * * *